US009224250B2

(12) United States Patent
Daoud et al.

(10) Patent No.: US 9,224,250 B2
(45) Date of Patent: Dec. 29, 2015

(54) VEHICLE TELEMATICS UNIT LOCKOUT RECOVERY

(71) Applicant: General Motors LLC, Detroit, MI (US)

(72) Inventors: Ayman R. Daoud, Novi, MI (US); James Doherty, Wyandotte, MI (US); Kyle M. Ellard, Farmington Hills, MI (US); Yao Hui Lei, Windsor (CA); Dipankar Pal, Sylvania, OH (US)

(73) Assignee: General Motors LLC, Detroit, MI (US)

(*) Notice: Subject to any disclaimer, the term of this patent is extended or adjusted under 35 U.S.C. 154(b) by 213 days.

(21) Appl. No.: 14/012,265

(22) Filed: Aug. 28, 2013

(65) Prior Publication Data

US 2015/0066287 A1 Mar. 5, 2015

(51) Int. Cl.

| | |
|---|---|
| ***G07C 5/00*** | (2006.01) |
| ***G07C 11/00*** | (2006.01) |
| *H04W 4/04* | (2009.01) |
| *H04W 60/06* | (2009.01) |

(52) U.S. Cl.

CPC ...................................... *G07C 5/008* (2013.01)

(58) Field of Classification Search

CPC ....................................................... G01C 5/008

See application file for complete search history.

(56) References Cited

U.S. PATENT DOCUMENTS

| | | | | |
|---|---|---|---|---|
| 8,886,367 | B2 * | 11/2014 | Abo El-Fotouh | 701/2 |
| 2003/0190030 | A1 * | 10/2003 | Alton | 379/219 |
| 2004/0259524 | A1 * | 12/2004 | Watkins et al. | 455/405 |
| 2006/0003762 | A1 * | 1/2006 | Sumcad et al. | 455/428 |
| 2015/0166007 | A1 * | 6/2015 | Hong | 701/1 |

OTHER PUBLICATIONS

3rd Generation Partnership Project; Technical Specification Group Core Network and Terminals; Mobile radio interface Layer 3 specification; Core network protocols; Stage 3 (Release 12).

* cited by examiner

*Primary Examiner* — Khoi Tran
*Assistant Examiner* — Dale Moyer
(74) *Attorney, Agent, or Firm* — Anthony Luke Simon; Reising Ethington P.C.

(57) ABSTRACT

A method of removing a vehicle telematics unit from an invalid state includes sensing that the vehicle telematics unit wirelessly received an invalid state code that deactivates the communication function of the vehicle telematics unit from a base station of a wireless carrier system; determining at the vehicle telematics unit that a reset trigger applicable to invalid state codes has been activated; and commanding the vehicle telematics unit to reset the invalid state code when the reset trigger has been activated thereby permitting the vehicle telematics unit to resume its communication function.

11 Claims, 2 Drawing Sheets

VEHICLE TELEMATICS UNIT LOCKOUT RECOVERY

TECHNICAL FIELD

The present invention relates to wireless communication systems and more particularly to vehicle telematics units.

BACKGROUND

Many vehicles presently include vehicle telematics units capable of carrying out wireless communications to and from the vehicle. These communications include both voice calls as well as calls that carry data. Wireless carrier systems can enable the vehicle telematics units to communicate when the units register with base stations operated by the wireless carrier system. And when the vehicle telematics units register, an initialization or handshake process occurs during which time the wireless carrier system can verify that a vehicle telematics unit or other wireless device is authorized to communicate using the wireless carrier system. Sometimes the initialization process can generate error codes that place the vehicle telematics unit in an invalid state or lockout state rendering the unit unable to communicate. Removing vehicle telematics units from this state can be challenging.

SUMMARY

According to an embodiment of the invention, there is provided a method of removing a vehicle telematics unit from an invalid state that includes sensing that the vehicle telematics unit wirelessly received an invalid state code that deactivates the communication function of the vehicle telematics unit from a base station of a wireless carrier system; determining at the vehicle telematics unit that a reset trigger applicable to invalid state codes has been activated; and commanding the vehicle telematics unit to reset the invalid state code when the reset trigger has been activated thereby permitting the vehicle telematics unit to resume its communication function.

According to another embodiment of the invention, there is provided a method of removing a vehicle telematics unit from an invalid state that includes sensing that the vehicle telematics unit wirelessly received an invalid state code that deactivates the communication function of the vehicle telematics unit from a base station of a wireless carrier system; detecting the deactivation and subsequent activation of a vehicle ignition switch; and commanding the vehicle telematics unit to reset the invalid state code in response to detecting the deactivation and subsequent activation of a vehicle ignition switch.

According to yet another embodiment of the invention, there is provided a method of removing a vehicle telematics unit from an invalid state that includes sensing that the vehicle telematics unit wirelessly received an invalid state code from a base station of a wireless carrier system that deactivates the communication function of the vehicle telematics unit; detecting an initiation of a call at the vehicle telematics unit after sensing the receipt of the invalid state code; determining that the initiation of the call generated a reset trigger applicable to the invalid state code; resetting the invalid state code in response to the determination that the reset trigger exists; and completing the initiated call from the vehicle telematics unit.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

The method described below removes a vehicle telematics from an inoperable, locked, or invalid state while maintaining compliance with cellular standards established by the Third Generation Partnership Project (3GPP) or 3GPP2. At some point, network access devices (NADs), such as vehicle telematics units, can attempt to attach to a wireless carrier system via its base station or cell tower and receive a code from the carrier system/base station that renders the communication function of the vehicle telematics units inoperable. The codes—once received—can prevent the vehicle telematics units from communicating until these codes are removed, which is traditionally accomplished by a user who powers a NAD device off and then on again. However, users of vehicle telematics units may not be able to power the units off and then on again like other NADs, such as handheld cellular phones. Even after a vehicle is turned off using a vehicle ignition switch, vehicle telematics units often remain powered and active long beyond turning off the vehicle. Vehicle telematics units commonly remain powered for ten days or more so that they can be ready to monitor vehicle functions and/or communicate data with back office facilities. In this configuration, a vehicle telematics unit may not be able to remove the invalid state if the vehicle does not remain turned off for an extended period of time (e.g., ten days). That is, the vehicle may not sit unused for an amount of time necessary to remove the vehicle telematics device from its inoperable state thus requiring a vehicle owner to bring the vehicle to the dealer or other repair facility to remedy the problem.

Nor is it reasonable to simply program the vehicle telematics units to remove the inactive codes immediately after they are received. The wireless carrier systems issue the inactive codes to prevent NADs from repetitively attempting access to the base station/cell tower after a problem has been detected. Programming the NAD to automatically remove the inactive code may subvert the reason the inactive codes exist. To be compliant with a number of cellular standards established by 3GPP, NADs like the vehicle telematics units cannot automatically remove the codes once they are received. However, these cellular standards permit removing the inactive codes from a vehicle telematics unit in a way that is similar to how a human user of a handheld NAD would. That is, the vehicle telematics unit can be programmed to remove the inactive codes so long as removal is subject to a reset threshold. The reset threshold can provide a check on the uncontrolled inactive code removal such that the vehicle telematics unit is compliant with cellular standards of the 3GPP yet still remove the inactive codes from the vehicle telematics unit without a dealer/service center visit.

Figure 1:
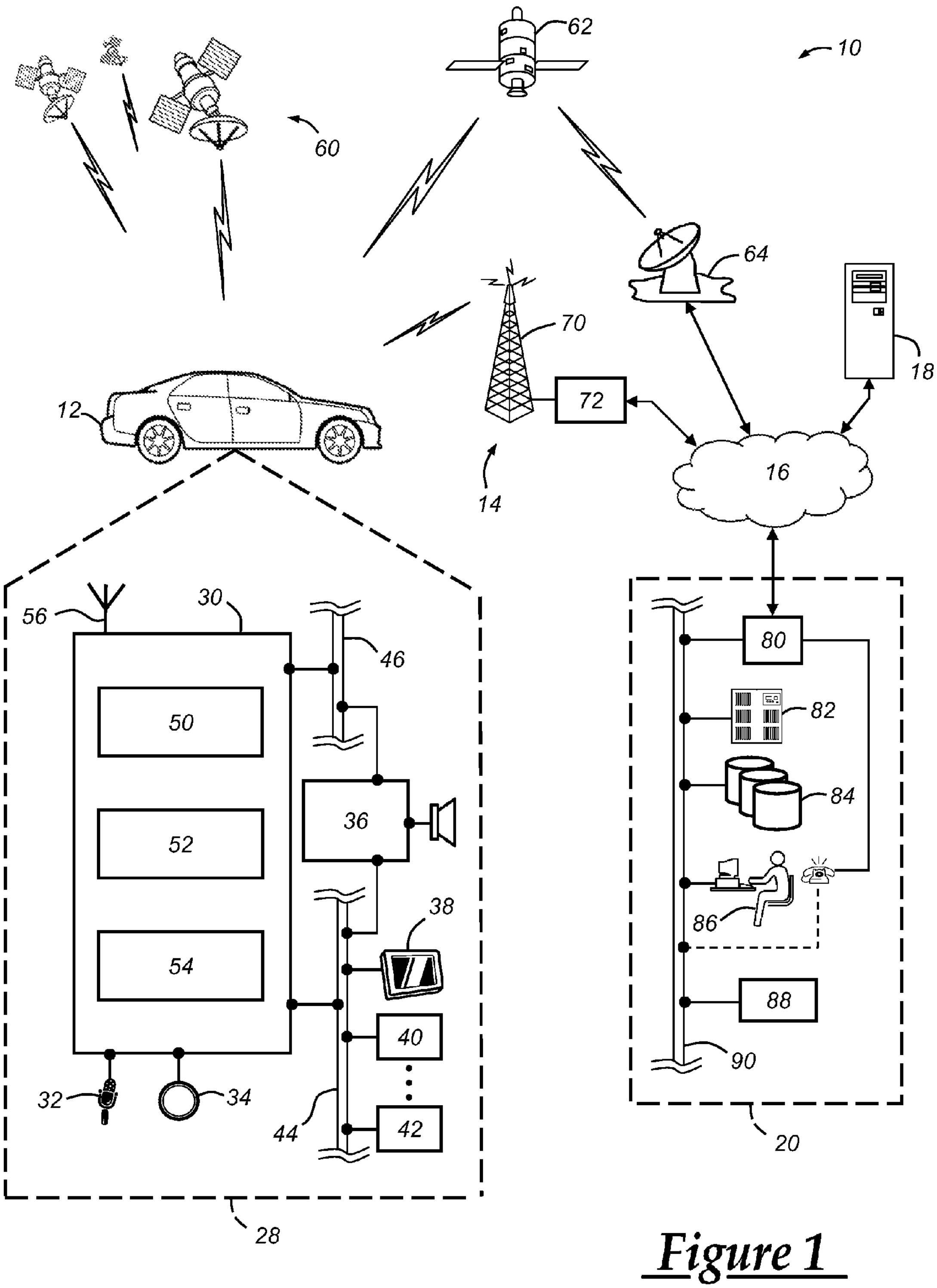
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as WCDMA, LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs)

42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000), GSM, GPRS, WCDMA, HSPA+, and LTE. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
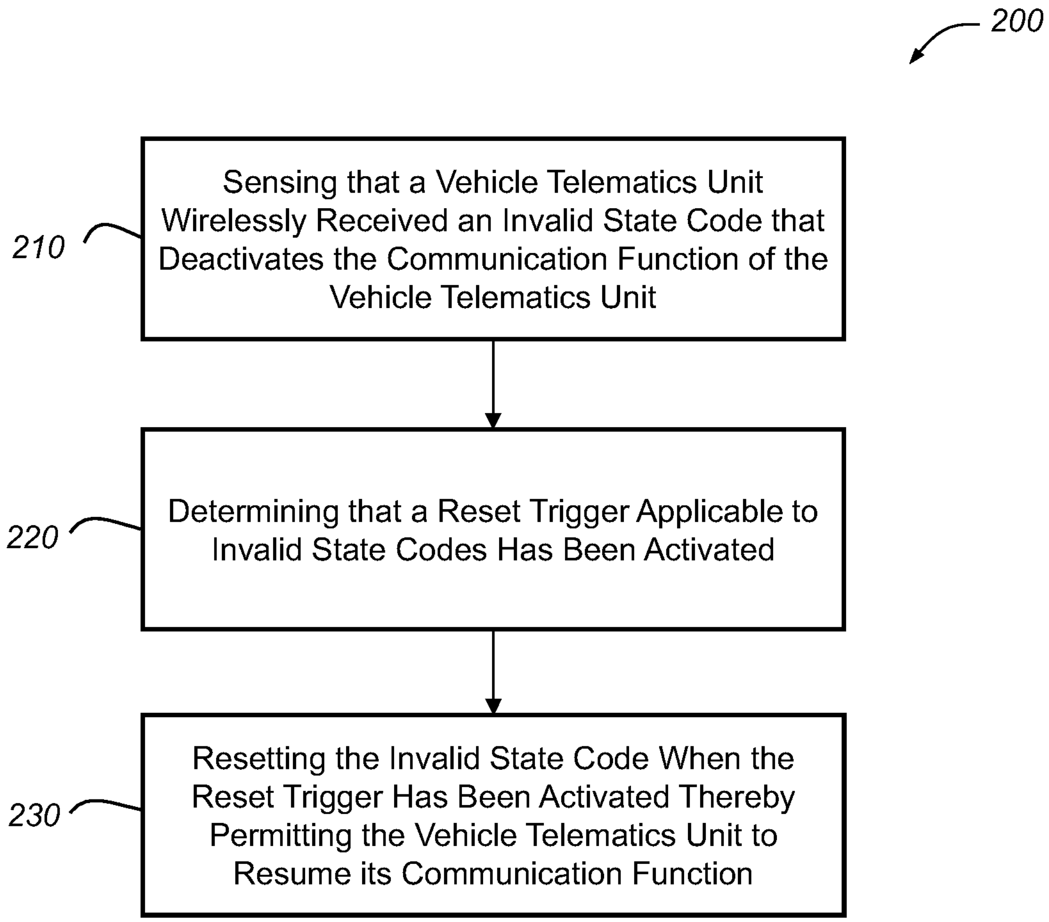
FIG. 2 is a flow chart of one embodiment of a method of removing a vehicle telematics unit from an invalid state.

Turning now to FIG. 2, there is shown a method 200 of removing the vehicle telematics unit 30 from an invalid state. The method 200 begins by sensing that the vehicle telematics unit 30 wirelessly received an invalid state code that deactivates the communication function of the vehicle telematics unit 30. The invalid state codes can include messages or codes sent from a base station 70 of a wireless carrier system 14 to the vehicle telematics unit 30 when, for example, a General Packet Radio Service (GPRS) attach of the unit 30 is not accepted by the system 14. Examples of these types of codes are discussed in technical standard (TS) 24.008 produced by 3GPP. In TS 24.008 (section 4.7.3.1.4), a list of possible invalid state codes are described. These codes include #2 (IMSI Unknown In HLR), #3 (Illegal MS), #6 (Illegal ME), #7 (GPRS services not allowed), and #8 (GPRS services and non-GPRS services not allowed). Other invalid state codes exist and the preceding list merely provides examples of these codes. More particularly, section 4.4.4.7 explains that the wireless carrier system 14 can consider the SIM/USIM of the vehicle telematics unit 30 as invalid for non-GPRS services until switch-off or the Subscriber Identity Module (SIM)/Universal Subscriber Identity Module (USIM) is removed. The invalid state codes can cause the vehicle telematics unit 30 to be invalid for GPRS and non-GPRS services thereby deactivating the communication function of the unit 30. It should also be appreciated that the vehicle telematics unit 30 can receive invalid state codes under circumstances other than a GPRS attach mechanism. For instance, the vehicle telematics unit 30 can also receive invalid state codes during a "Location Update," a "Connection Establishment," a "Routing Area Update," or a "Combined GPRS attach." It should be appreciated that other circumstances are possible. When the vehicle telematics unit 30 receives the invalid code, the processor 52 can detect the presence of the invalid code. The method 200 proceeds to step 220.

At step 220, it is determined at the vehicle telematics unit 30 that a reset trigger applicable to invalid state codes exists. To ensure that the invalid state codes are not reset without limit, a number of defined triggers in the vehicle 12 can be monitored to determine whether or not to reset the invalid state codes. When one of these reset triggers are activated or detected, the vehicle telematics unit 30 can then be allowed to remove the invalid state codes. A number of vehicle functions or actions can be associated with the reset triggers such that the existence of one of these functions/actions will activate the reset trigger. The vehicle telematics unit 30 can detect the existence of the reset trigger and proceed to remove the invalid state code. Reset triggers can be generated by the actuation of a vehicle ignition switch (e.g., turning it on or off), a vehicle occupant initiating a call from the vehicle 12 using the vehicle telematics unit 30, or a collision event with the vehicle 12 to identify a few examples of vehicle functions that can be used to implement reset triggers.

For example, the vehicle telematics unit 30 can determine that the vehicle 12 has received an invalid state code rendering the unit 30 unable to communicate. Then, a vehicle occupant can initiate a call using the vehicle telematics unit 30. The vehicle telematics unit 30 can then identify or detect that the initiation of the call is a reset trigger and then remove the invalid code. Other implementations of the reset triggers are possible. In another example, the vehicle 12 or vehicle telematics unit 30 may have received an invalid state code and be unable to communicate. After this occurs, the vehicle 12 may be in an accident or collision that is detected using the vehicle electronics 28. The telematics unit 30 can identify or detect that the collision is a reset trigger and then remove the invalid state code in response to detecting the reset trigger. It should be appreciated that these are just a few ways the reset triggers can be implemented and others are possible. The method 200 proceeds to step 230.

At step 230, the vehicle telematics unit 30 is commanded to reset the invalid state code when the reset trigger has been activated and/or detected thereby permitting the vehicle telematics unit 30 to resume its communication function. The vehicle telematics unit 30 can reset the invalid state code by turning off itself off and then on again, often referred to as "power cycling." As noted above, vehicle telematics units 30 do not commonly do this unless the vehicle 12 is left unattended for long periods of time (e.g., 10 days). When the vehicle telematics unit 30 detects the presence of an invalid state code and the presence of a reset trigger, the unit 30 can reset the invalid code through power cycling itself. Without the presence of the invalid code, the vehicle telematics unit 30 may not normally turn itself off and on again in response the deactivation/activation of the vehicle ignition switch. However, actuation of the vehicle ignition switch can generate a reset trigger when an invalid code is present and can be used to direct the removal of the invalid codes. The processor 52 of the vehicle telematics unit 30 can determine the status of the SIM belonging to the unit 30 each time the vehicle ignition is activated. When the SIM has been placed in an inactive state in response to inactive codes, the unit 30 can determine if reset triggers exist and reset itself if allowed. As noted above, it is possible to command the vehicle telematics unit 30 to reset the invalid state code in response to detecting the initiation of a call (e.g., a reset trigger). The vehicle occupant can attempt or initiate a call using the vehicle telematics unit 30 that has received an invalid code. After detecting the presence of an invalid code, the vehicle telematics unit 30 can determine the vehicle occupant is attempting the call and remove the invalid code in response to the call initiation. Once the invalid state code has been removed, the initiated call can be completed. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of removing a vehicle telematics unit from an invalid state, comprising the steps of:

(a) sensing that the vehicle telematics unit wirelessly received an invalid state code that deactivates the communication function of the vehicle telematics unit from a base station of a wireless carrier system;

(b) determining at the vehicle telematics unit that a reset trigger applicable to invalid state codes has been activated; and (c) commanding the vehicle telematics unit to reset the invalid state code when the reset trigger has been activated thereby permitting the vehicle telematics unit to resume its communication function.

2. The method of claim 1, further comprising the step of sensing the receipt of the invalid state code using a processor at the vehicle telematics unit.

3. The method of claim 1, further comprising the step of determining that a vehicle occupant is initiating a call after carrying out step (a).

4. The method of claim 1, wherein the reset trigger is initiated by a vehicle ignition, a call initiation, or a collision event.

5. The method of claim 1, further comprising the step of commanding the vehicle telematics unit to reset the invalid state code in response to detecting a deactivation and activation of a vehicle ignition switch.

6. A method of removing a vehicle telematics unit from an invalid state, comprising the steps of:

(a) sensing that the vehicle telematics unit wirelessly received an invalid state code that deactivates the communication function of the vehicle telematics unit from a base station of a wireless carrier system;

(b) detecting the deactivation and subsequent activation of a vehicle ignition switch; and (c) commanding the vehicle telematics unit to reset the invalid state code in response to detecting the deactivation and subsequent activation of a vehicle ignition switch.

7. The method of claim 6, further comprising the step of sensing the receipt of the invalid state code using a processor at the vehicle telematics unit.

8. The method of claim 6, further comprising the step of detecting the deactivation and subsequent activation of a vehicle ignition switch after carrying out step (a).

9. A method of removing a vehicle telematics unit from an invalid state, comprising the steps of:

(a) sensing that the vehicle telematics unit wirelessly received an invalid state code from a base station of a wireless carrier system that deactivates the communication function of the vehicle telematics unit;

(b) detecting an initiation of a call at the vehicle telematics unit after sensing the receipt of the invalid state code;

(c) determining that the initiation of the call generated a reset trigger applicable to the invalid state code;

(d) resetting the invalid state code in response to the determination that the reset trigger exists; and (e) completing the initiated call from the vehicle telematics unit.

10. The method of claim 9, wherein the reset trigger is initiated by a vehicle ignition or a collision event.

11. The method of claim 9, further comprising the step of sensing the receipt of the invalid state code using a processor at the vehicle telematics unit.

* * * * *